United States Patent [19]
Terase et al.

[11] 3,737,769
[45] June 5, 1973

[54] AUTOMATIC INSULATION CHARACTERISTIC ANALYZING DEVICE

[75] Inventors: Hitoshi Terase, Nagoya; Sumio Namikawa, Tokyo, both of Japan

[73] Assignee: Kyokuto Boeki Kaisha, Ltd., (Far East Mercantile Co., Ltd., Tokyo, Japan

[22] Filed: Feb. 14, 1972

[21] Appl. No.: 225,857

[30] Foreign Application Priority Data
  Mar. 16, 1971  Japan..................................46/14512

[52] U.S. Cl................................................324/54
[51] Int. Cl..............................................G01r 31/14
[58] Field of Search..................................324/52, 54

[56] References Cited
UNITED STATES PATENTS

| | | | |
|---|---|---|---|
| 2,837,714 | 6/1958 | Hill | 324/54 |
| 3,199,023 | 8/1965 | Bhimani | 324/54 |
| 3,281,673 | 10/1966 | Richardson | 324/52 |
| 3,543,092 | 11/1970 | Hoel | 324/52 X |

Primary Examiner—Gerard R. Strecker
Attorney—Flynn & Frishauf

[57] ABSTRACT

A rectifier and integrator circuit is provided for rectifying an alternating current voltage corresponding to that applied across a specimen to be tested and obtaining the mean value V of the applied voltage from the rectified voltage, and another rectifier and integrator circuit is provided for rectifying an alternating current flow corresponding to that flowing through the specimen and obtaining the mean value I of the current flow from the rectified current flow. A sample holding circuit is provided for storing the mean value $V_1$ of the applied voltage as obtained in the previous sampling cycle, and a sample holding circuit is provided for storing the mean value $I_1$ of the current flow as obtained in the previous sampling cycle. A differential amplifier is provided for receiving the mean value $V_1$ signal and a signal of the mean value $V_2$ of the applied voltage as obtained in the following sampling cycle and generating an output corresponding to the difference $\Delta V$ between the signals, and another differential amplifier is provided for receiving the mean value $I_1$ signal and a signal of the mean value $I_2$ of the current flow as obtained in the following sampling cycle and generating an output corresponding to the difference $\Delta I$ between the signals. A divider is provided for obtaining the value of $\Delta I/\Delta V$ characteristic of insulating properties of the specimen, and a sample holding circuit is provided for storing the $\Delta I/\Delta V$ value as obtained just when the difference $\Delta V$ reaches a predetermined value and supplying the stored $\Delta I/\Delta V$ value signal to a displaying device. A timing circuit is arranged to control the operations of the said circuits through each sampling cycle so that the insulation characteristics of the specimen can be automatically measured at a high speed.

7 Claims, 3 Drawing Figures

Patented June 5, 1973 3,737,769

AUTOMATIC INSULATION CHARACTERISTIC ANALYZING DEVICE

BACKGROUND OF THE INVENTION

Conventional A.C. current testing methods have been used to non-destructively detect voids in a dry-type insulated structure such as the stator coil of generators or motors, or non-destructively measure the void contents or the break-down voltages of such structures. According to the conventional A.C. current testing methods, a commercial frequency voltage is applied across an insulating specimen to be tested. The applied voltage and the current flow through the specimen are measured by use of a voltmeter and an ammeter respectively. An operator dots the readings of the voltmeter and the ammeter on a sheet of graph paper to depict a current I-voltage V characteristic curve on the graph paper. From the characteristic curve, the first and second voltages $P_{i1}$ and $P_{i2}$ at which the current increasing rate $\Delta I/\Delta V$ is suddenly and widely changed are read out. The breakdown voltage of the specimen can be estimated by multiplying $P_{i2}$ by a constant dependent on the kind of the specimen. The current increasing ratio can be evaluated by drawing figures. This current increasing ratio is used to determine the void content of the specimen. As seen from the foregoing, conventional methods require the reading-out of voltage and current values from a voltmeter and an ammeter respectively, and a long time for drawing figures. Moreover, these methods need at least two operators. In the event that these methods are employed to test an insulating specimen having a small void content, they will tend to cause a measurement error because changes in the value $\Delta I/\Delta V$ will be small.

It is an object of this invention to eliminate such defects as mentioned above.

SUMMARY OF THE INVENTION

This invention relates to an automatic insulation characteristic analyzing device for non-destructively measuring the break-down voltage of an electrical machinery which is one of important factors for judging the insulating performance or the deterioration degree of the insulating materials of the electrical machinery, or for measuring changes in partial discharges in the insulating materials of an electric machinery as the applied voltage increasingly changes, or measuring change in the number of voids in which void discharge is being caused, in the insulating materials of the electrical machinery as the applied voltage changes increasingly.

An analyzing device according to this invention is characterized in that a relationship between the A.C. voltage applied to an insulating specimen to be tested and the said A.C. current flow through the specimen due to the said applied voltage, which current flow is changed dependently on how much void discharge is caused in the specimen, can be determined through a high speed arithmetic operation so that change in the current flow due to the increasing applied voltage may be continuously detected with a high accuracy, In this manner, the time required for testing can be reduced and the number of necessary operators can be reduced.

DESCRIPTION OF THE PREFERRED EMBODIMENTS

Figure 1:
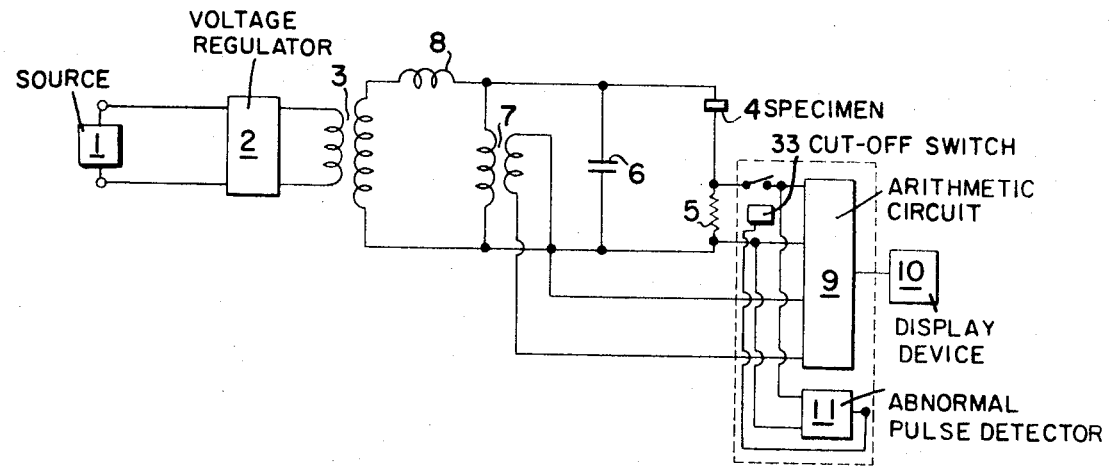
FIG. 1 is a schematic diagram of the electric circuit of an analyzing device according to this invention.

Referring now to FIG. 1, reference number 1 is a commercial frequency voltage source, 2 is an automatic voltage regulator, 3 is a testing transformer, 4 is a specimen to be tested, 5 is a resistor for detecting electric current flow through the specimen, 6 is a by-pass condenser, 7 is an instrument transformer, 8 is a choke coil for blocking harmonic waves or noises from the voltage source, 9 is an arithmetic operation circuit for obtaining $\Delta I/\Delta V$ value as constructed according to this invention, 10 is a display device, 11 is a circuit for detecting abnormal corona pulses, and 33 is a circuit breaker for stopping the test when an abnormal corona pulse is detected. The arithmetic operation circuit 9 and the abnormal corona pulse detecting circuit 11 are shown in greater detail in FIG. 3.

Figure 2:
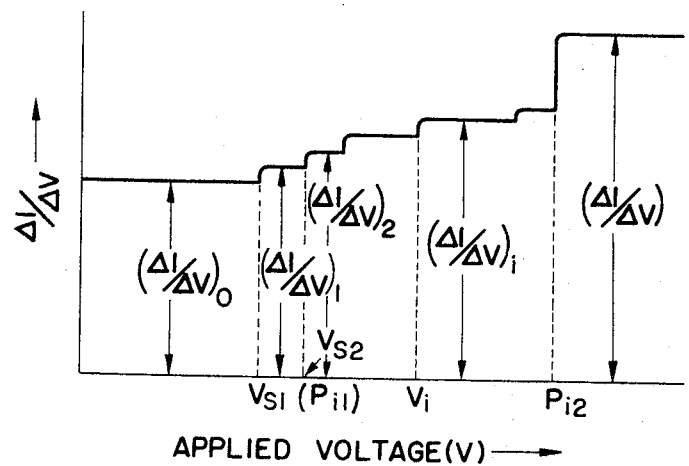
FIG. 2 shows a graph of test results as recorded in an X - Y recorder as the display device.

In FIG. 2, there is illustrated a $\Delta I/\Delta V$ - voltage characteristic curve as recorded in an X–Y recorder as the output device. From this characteristic curve, the following information on the insulating property of the specimen can be obtained.

In a range of the applied voltage below the first suddenly current increasing voltage $P_{i1}$ wherein $\Delta I/\Delta V$ is constant, partial discharge is only expected to be caused. In this range, the electrostatic capacity of $C_x$ of the specimen can be calculated from $(\Delta I/\Delta V)_0$ as follows:

$$C_x = 1/2\pi f (\Delta I/\Delta V)_0 \qquad (1)$$

where $f$ is the frequency of the voltage source.

When discharge is caused in a void the corona starting voltage of which is lowest among the other voids of the insulating specimen, the value of $\Delta I/\Delta V$ is firstly changed. The applied voltage at which this occurs is referred to as the first suddenly current increasing voltage $P_{i1}$ ($V_{i1}$). The value of $\Delta I/\Delta V$ at this voltage $P_{i1}$ is referred to as $(\Delta I/\Delta V)_1$. The following ratio $m_1$ will change dependent on the number of voids in the specimen wherein void discharge is caused due to the applied voltage.

$$m_1 = (\Delta I/\Delta V)_1 / (\Delta I/\Delta V)_0 \qquad (2)$$

The larger value of the ratio $m_1$ indicates the larger number of such voids. The value of $(\Delta I/\Delta V)_1$ is constant unless the degree of the void discharges is changed. Because of the fact that corona discharges are successively caused in a group of voids having different corona starting voltage as the applied voltage increases, the value of $\Delta I/\Delta V$ is increased step by step as shown in FIG. 2. The difference between $(\Delta I/\Delta V)_1$ and $(\Delta I/\Delta V)_2$ in FIG. 2 is related to the number of voids having a corona starting voltage of $V_{i2}$ as contained in the specimen.

As shown in FIG. 2, the voltage at which the value of $\Delta I/\Delta V$ is greatly increased is referred to as $P_{i2}$. The value of $\Delta I/\Delta V$ at this point is referred to as $(\Delta I/\Delta V)P_{i2}$. The following ratio $m_{i2}$ is representative of the degree of local short-circuiting as caused due to increasing void discharge.

$$m_{i2} = (\Delta I/\Delta V)P_{i2}/(\Delta I/\Delta V)_0 \quad (3)$$

The greater value of this ratio $m_{i2}$ means a greater local short-circuiting.

A measurement of the corona current flow at an applied voltage V can be obtained from an area as encompassed by a segment of the curve $\Delta I/\Delta$ through a horizontal linear line passing through the $(\Delta I/\Delta V)_0$ point in the axis of ordinate of the graph of FIG. 2, and a vertical linear line passing through the V point in the axis of abscissa. Namely, the corona current $\Delta I$ at an applied voltage V can be calculated from the following equation:

$$\Delta I = \frac{2\sqrt{2}}{\pi} \int_{V_{a1}}^{V} \text{(the increment of } \Delta I/\Delta V) dV \quad (4)$$

Thus, many informations necessary to judge the insulating property of the specimen can be obtained.

Figure 3:
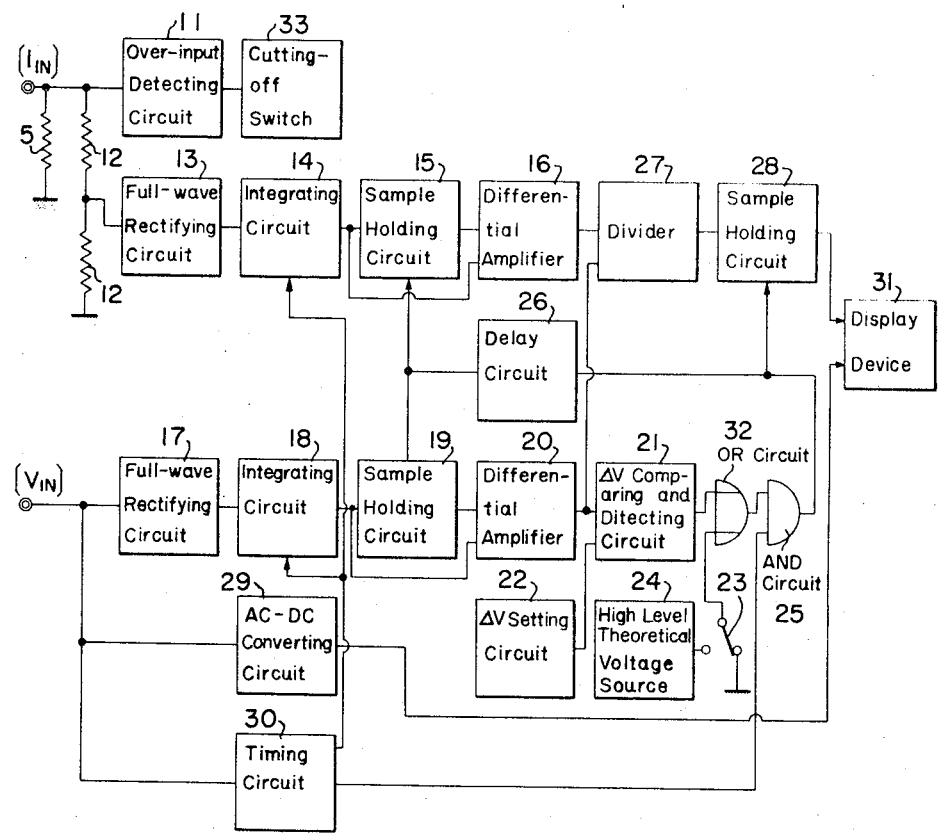
FIG. 3 is a block diagram of the main electric circuit of the device according to this invention.

Referring to FIG. 3, reference number 12 is a voltage divider resistor, 13 and 17 are full-wave rectifying circuits for rectifying the detected current and the detected voltage respectively, and 14 and 18 are integrating circuits for obtaining the mean values of the detected rectified current and voltage respectively. 15 and 19 are sample holding circuits for storing the obtained mean current and voltage respectively. 16 and 20 are differential amplifiers for detecting $\Delta I$ and $\Delta V$ respectively. 27 is a divider for obtaining the value of $\Delta I/\Delta V$. 28 is a sample holding circuit for sampling a value of $\Delta I/\Delta V$ and holding the sampled value. 21 is a $\Delta V$ comparing and detecting circuit, 22 is a $\Delta V$ setting circuit, 23 is a resetting switch, 32 is an OR circuit, 24 is a high level theoretical voltage source, and 25 is an AND circuit. The AND circuit 25 transmits a sampling signal to the sample holding circuit 28 and to the sample holding circuits 15 and 19 through a delay circuit 26, when the AND circuit 25 receives simultaneously a sampling signal from a timing synchronized 30 synchronized with respect to the frequency of the commercial frequency voltage source and a sampling signal from the OR circuit 32 generated due to a sampling signal from the $\Delta V$ comparing and detecting circuit 21 or resetting. The purpose of the delay circuit 26 is to cause the sample holding circuits 15 and 19 to start the next sampling cycle after the sampling of $\Delta I/\Delta V$ by the sample holding circuit 28 is completed. 29 is a AC-DC converting circuit for indicating a voltage applied to a specimen being measured. 11 is an over-input detecting circuit (abnormal corona pulse detecting circuit).

An example of this invention employing an X–Y recorder 31 as a display device will be described in connection with FIG. 3.

With the voltage applied to the specimen being kept constant, the detected voltage from the instrument transformer 7 (see FIG. 1) is rectified by the full-wave rectifying circuit 17. Assuming that a time in which the mean value of the detected voltage is determined is $T_1$ (for example, 40 milliseconds), the detected voltage is integrated by the integrating circuit 18 for $T_1$. As a result of this, the mean value of the detected voltage in $T_1$ is obtained from the integrating circuit 18. Assuming that the arithmetic operation time of the sample holding circuits 15, 19, 28 and the divider 27 is $T_2$ (for example, 10 milliseconds), the obtained mean value of the detected voltage is held for $T_2$. This is reset in the following period of $T_3$ (for example, 10 milliseconds). In the integrating circuit 18, an operation performed through time periods $T_1$, $T_2$ and $T_3$ as mentioned above is repeated. The sample signals are presented to the sample holding circuits 15, 19 and 28 in the timing period $T_2$. Therefore, if a high level theoretical voltage 24 is applied to one of the inputs of the OR circuit 32 through the resetting switch 23 during any of the periods ($T_1 + T_2 + T_3$) (40 ms + 10 ms + 10 ms), at least one sample signal will be obtained from the output of the AND circuit 25, thereby the obtained mean value of the detected voltage is stored in the sample holding circuit 19. On the other hand, the detected current from the detecting resistor 5 is set to a suitable operational level by the voltage divider resistor 12 and rectified by the full-wave rectifying circuit 13. The rectified current is integrated in the integrating circuit 14 for a time period of $T_1$. Thus the mean value of the detected current is obtained. The obtained mean value of the detected current is held for the following period of $T_2$, and reset in the further following period of $T_3$. Also in the integrating circuit 14, an operation performed through time periods $T_1$, $T_2$ and $T_3$ as mentioned above is repeated. As in the case of the mean value of the detected voltage, the mean value of the detected current is stored in the sample holding circuit 15 through the resetting switch 23 in the timing period of $T_2$.

As the voltage applied across the specimen is then increased, the values of $\Delta V$ and $\Delta I$ are obtained as outputs of the differential amplifiers 20 and 16 in successive timing periods of $T_2$, and arithmetic operations of obtaining the values of $\Delta I/\Delta V$ are performed by the divider 27. When the value of $\Delta V$ reaches a predetermined value as set in the $\Delta V$ setting circuit 22, a sample signal is generated from the $\Delta V$ comparing and detecting circuit 21 to cause the OR circuit 32 and the AND circuit 25 to produce an output signal. This output signal permits the output, $\Delta I/\Delta V$ of the divider 27 at this time to be stored and held in the sample holding circuit 28 and simultaneously causes the mean values of the voltage and the current at this time to be newly stored in the sample holding circuits 15 and 19. This causes the two inputs of the differential amplifiers 16 and 20 to receive the same signals, so that the outputs of the differential amplifiers 16 and 20 become zero. The stored $\Delta I/\Delta V$ value continues to be stored in the sample holding circuit 28 until the voltage applied to the specimen is increased to the extent that the output, $\Delta V$ of the differential amplifier 20 reaches again the predetermined value as set in the $\Delta V$ setting circuit 22, thereby the new value of $\Delta I/\Delta V$ is obtained. In this manner, as the voltage applied across the specimen is arbitrarily increased, the values of $\Delta I/\Delta V$ can be successively obtained. These outputs, $\Delta I/\Delta V$ values obtained from the sample holding circuit 28 are supplied to the Y-axis input of the X–Y recorder as display 31. In this example, if a predetermined value of $\Delta V$ as set in the $\Delta V$ setting circuit 22 is 100 mV at a full scale of 10 V, the number of times of arithmetic operation is 100. If the time necessary for one arithmetic operation of $\Delta I/\Delta V$ is 60 milliseconds, the testing will be completed in 6 seconds. It will be appreciated that the apparatus of this invention can effect testing at a much higher speed and with a much higher accuracy than conventional methods do. The output of the instrument transformer 7 is converted into a D.C. voltage output in the AC-DC converting circuit 29 and then supplied to the X-axis input of the X-Y recorder of the display device 31 to display the voltage applied to the specimen. The over-input detecting circuit 11 serves to detect an over input due to the generation of an abnormal corona pulse and actuates the cutting-off switch 33 to prevent the destruction of the specimen due to the over input, thereby stopping the testing.

According to the apparatus of this invention, any optimum value of $\Delta V$ can be set for testing a specimen, dependent on the kind of the specimen.

What we claim is:

1. An automatic insulation characteristic analyzing device comprising:
   a first full-wave rectifier for rectifying an alternating current flow corresponding to the current flow through a specimen to be tested,
   a first integrator for integrating the output of said first rectifier,
   a first sample holding circuit for storing the output of said first integrator,
   a first differential amplifier for detecting the difference $\Delta I$ between the outputs of said first integrator and said first sample holding circuit,
   a second full-wave rectifier for rectifying an alternating current voltage corresponding to that applied across the specimen,
   a second integrator for integrating the output of said second rectifier,
   a second sample holding circuit for storing the output of said second integrator,
   a second differential amplifier for detecting the difference $\Delta V$ between the outputs of said second integrator and said second sample holding circuit,
   a divider for dividing the output of said first differential amplifier by the output of said second differential amplifier to obtain an output $\Delta I/\Delta V$,
   a third sample holding circuit for holding the output of said divider until the next sampling cycle,
   a detecting means for detecting when the output of said second differential amplifier reaches a predetermined value of $\Delta V$,
   an AND circuit having its output coupled to said third sample holding circuit and being arranged to turn on at each simultaneous receipt of a sample signal from said detecting means and a timing signal as synchronized with the frequency of said applied alternating current voltage, thereby synchronizing the output of said detecting means with the frequency of the applied alternating current voltage and
   a converting means coupled to said alternating current voltage and converting said alternating current voltage into a direct current voltage, the insulation characteristics of the sample being tested being a function of both the values of $\Delta I/\Delta V$ and the value of the direct current output of said converting means.

2. A device as defined in claim 1 and further including a display device for displaying the output of said third sample holding circuit as a function of the output of said converting means.

3. A device as defined in claim 1 wherein said first and second sample holding circuits, said first and second differential amplifiers, said detecting means and said AND circuit are arranged to adjust said predetermined value of $\Delta V$.

4. A device as defined in claim 1 comprising means coupled to said detecting means for adjusting said predetermined value of $\Delta V$.

5. A device as defined in claim 1 wherein said insulation characteristics of the sample are a function of the value of $\Delta I/\Delta V$ when the value of $\Delta V$ reaches said predetermined value, and of the value of the direct current output of said converting means.

6. A device as defined in claim 1 wherein said AND circuit is further coupled to said first and second sample holding circuits.

7. A device as defined in claim 5 wherein said AND circuit is coupled to said first and second sample holding circuits through a delay circuit.

* * * * *